Dec. 11, 1956 P. F. F. CASTELLANI 2,773,598
APPARATUS FOR THE SELECTIVE AND/OR TOTAL SEPARATION
AND COLLECTION OF PARTICLES FROM
SUSPENSION IN FLUID MEDIA
Filed April 1, 1953 2 Sheets-Sheet 1

INVENTOR
Pio Federico Faloppa Castellani

INVENTOR
Pio Federico Faloppa Castellani

United States Patent Office 2,773,598
Patented Dec. 11, 1956

2,773,598

APPARATUS FOR THE SELECTIVE AND/OR TOTAL SEPARATION AND COLLECTION OF PARTICLES FROM SUSPENSION IN FLUID MEDIA

Pio Federico Faloppa Castellani, Milan, Italy, assignor to Termokimik Corporation, Milan, Italy, a corporation of Italy Application April 1, 1953, Serial No. 346,175

23 Claims. (Cl. 209—144)

This invention relates to apparatus for the selective and/or total separation and collection of particles held in suspension in fluid media up to a regulable granulometric value to meet the technological necessities for their further utilization as well as a unit, the function of which is designed to attain the total separation and collection of these particles within the efficiency range of the apparatus.

Many industrial fluids, e. g., the gases resulting from the complete or partial combustion of fuels in boilers, iron and steel furnaces and the like, gases and fumes emitted by chemical processes, steam and air used for the transportation of materials, etc., contain particles which it is desirable to remove either for the economic value of the particles or for the use of the fluid in subsequent processes or because of pollution laws which regulate the kind and amounts of particles which may be left in gases which are discharged to the atmosphere etc. Many types of particle-collecting apparatus have been heretofore proposed to solve the problem of removing particles from fluid suspension but have been unsatisfactory or not completely satisfactory for various reasons including, for instance, low efficiency.

I provide an apparatus which overcomes the difficulties of prior art separating mechanisms and which provides for the selective and/or total separation and collection of the particles held in suspension in fluids such as air, smoke, steam, etc. Preferably, I provide a chamber wherein the gas undergoes a reduction in velocity and a change in direction and leaves through an outlet across which is provided a deflection system having a number of baffles which may be independently set with respect to one another. This chamber preferably connects with another chamber for the discharge of the particles which are dropped in it. The unit for the separation embodies at least one device which develops a centrifugal action and in which I provide a generally frusto-conical member, the large end of which forms a fluid inlet section of substantially greater cross-sectional area than that of the smaller end, at least one substantially helical internal vane beginning adjacent the inlet end of the frusto-conical member and extending to a point at or near the opposite end thereof and surrounding a generally cylindrical inner hollow element which forms with the frusto-conical member and the helical vane a series of helical passages of simultaneously decreasing cross-section in two planes imparting a controlled rapid increase in the velocity of the fluid passing therethrough. The large end of the frusto-conical outer member is preferably polygonal in shape ranging from substantially circular to triangular in shape, the preferred form being, however, hexagonal. The space which is formed by the helical vanes between the outer and inner elements forms a number of distributing nozzles of essentially helicoidal trend, with varying cross-sections in two planes gradually decreasing from the inlet to the outlet of the fluid path in the nozzles, and which preferably terminate in the outer hollow cylindrical member [preferably spaced from the inner extremity of the inner element so that the inner element extends beyond the ends of the vanes]. The helicoidal vanes are preferably in tight contact with the inner and outer elements throughout their entire length to form a tightly assembled distributing nozzle of decreasing cross-section.

While certain features of the invention have been described above, other details, objects, and advantages of the invention will become apparent from a consideration of the following and the accompanying drawings in which Figure 1 is a vertical section of an apparatus showing a unit designed to obtain the selective separation and collection by means of a controllable deflection system, as well as a unit designed to obtain the total separation and collection by means of only one centrifugal device with a hexagonal end feeding section;

Figure 4:
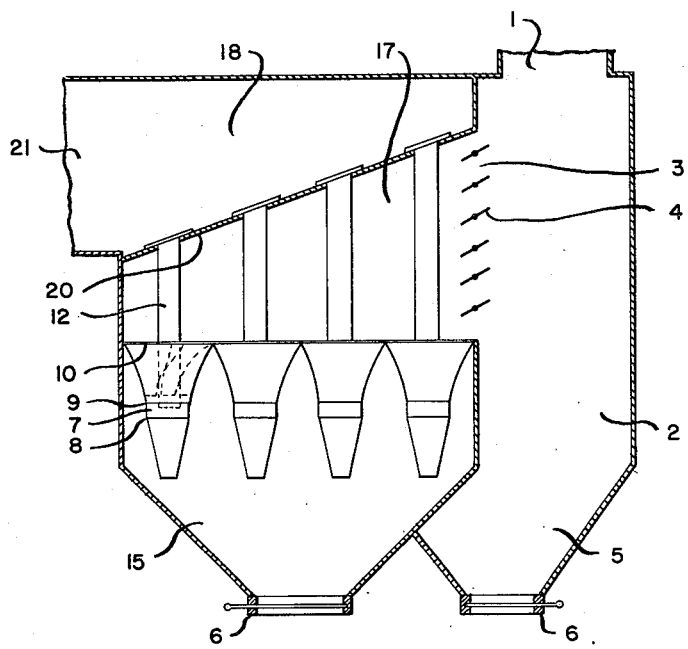
Figure 4 is a vertical section of an apparatus showing a unit designed to obtain the selective separation and collection by means of a controllable deflection system, as well as a unit designed to obtain the total separation and collection by means of a plurality of centrifugal devices with hexagonal end feeding sections.
Figure 5:
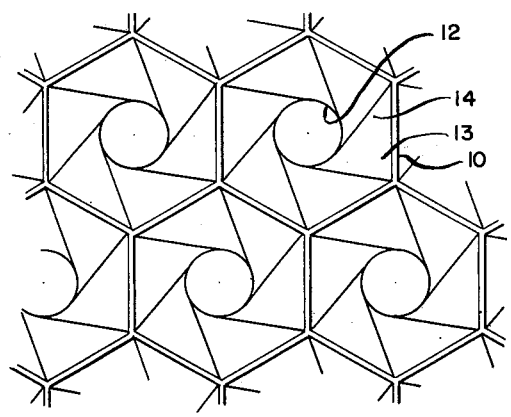

Figure 5 shows the outlined appearance of the end feeding section, without interstitial areas, of a unit for the total separation and collection, as represented in Figure 4, which embodies a plurality of centrifugal devices, the end feeding sections of which are continuously jointly united following each other in continuous connection, forming thus a honeycomb plane with closed hexagonal meshes creating a single one-structured and self-bearing assembly.

Referring to the drawings outlined in Figures 1 to 5, there is illustrated an inlet 1 through which the particle-laden fluid enters into chamber 2 of selective separation, and a fluid outlet 3 across which is placed a controllable deflection system, made up of a number of baffles 4, the width of each of which is designed to suit the required working conditions for each particular case. These baffles 4 can have any setting independently of each other and with respect to the center line of the outlet section, as each of these can be revolved and positioned at will by means of suitable controls not shown in the figure. The inlet 1 and outlet 3 of the fluid are shown, in the figures, as being located on plane surfaces at right angles, but they can nevertheless take any desired position with respect one to the other. Chamber 2 extends itself in an underlying one 5, where the selected particles are collected and which is fitted with a system 6 for their discharge. The whole of the unit for the regulable selective separation and collection is fluid-tight with the outside.

Figure 1:
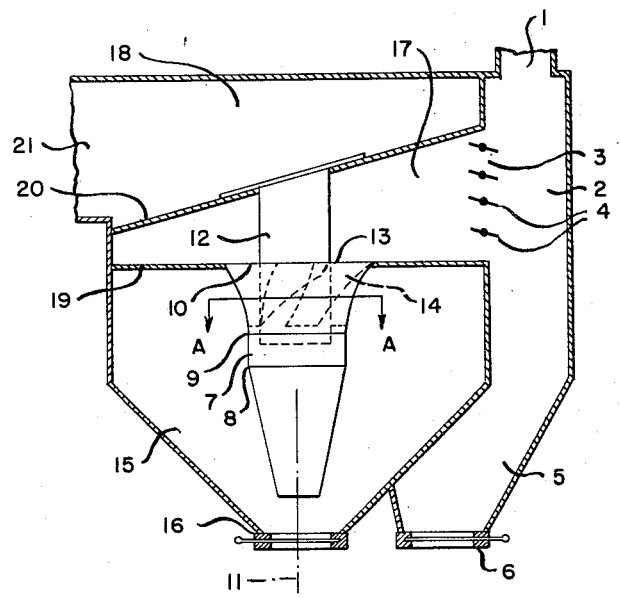
Figure 2:
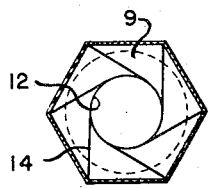
Figure 2 is a section on the line A—A of the hexagonal feeding end of the centrifugal device shown in Figure 1.
Figure 3:
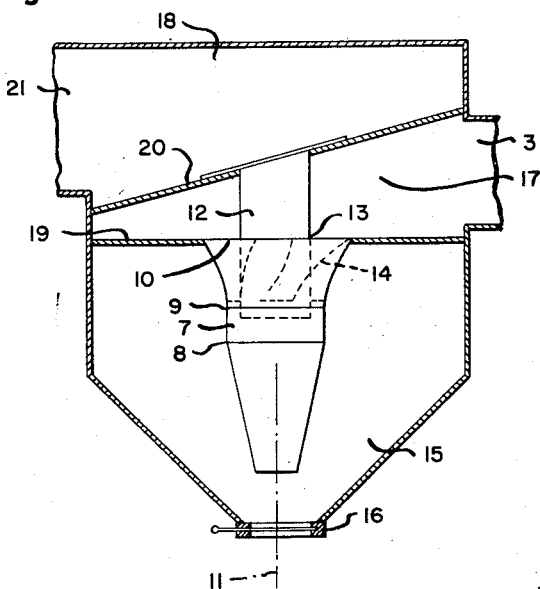
Figure 3 is a vertical section of an apparatus showing only the unit designed to obtain the total separation and collection by means of only one centrifugal device with hexagonal end feeding section.

The unit for the total separation and collection may embody one (Figures 1 and 3) or a plurality (Figures 4 and 5) of centrifugal devices each of which is made up of an outer hollow cylindrical element 7 which, starting from section 8, tapers conically to the extreme outlet from which is discharged the separated particles, while, on the opposite side, starting from section 9, it gradually expands up to its end feeding section 10 coming to form there a hexagonal section (Figures 1 to 5) which, in Figures 1 and 3 lies on the same plane of the plate 19 which determines the fluid-tight partition, between the feeding chamber 17 of the particle-laden fluid and the collection and discharge chamber 15 of the separated particles. In other embodiments the element 7 gradually expands up to its end feeding section where this section is complemented by suitable borders in order to have it take the shape of a polygon.

The whole of the outer element 7, starting from its polygonal end feeding section 10 (Figures 1, 3 and 4) is placed in the collection and discharge chamber 15 for the separated particles which discharge chamber is fitted with means for the removal of these particles. In other embodiments the outer element 7 extends above, with its polygonal end feeding section the fluid-tight partition plate 19 between chamber 17 and chamber 15 to suit the required working conditions for each particular case.

Coaxial with the outer element 7 and inside of it, a cylindrical hollow element 12 is set which crosses the feeding chamber 17 of the particle-laden fluid, fluid-tight to it, and enters fluid-tight into the exhaust chamber 18 of the particle-free fluid. The space between the outer element 7 and the inner one 12 is evenly divided in six distributing nozzles 13 which have an essentially helicoidal trend with constant pitch, with variable cross sections gradually decreasing from the inlet to the outlet of the fluid in the nozzles, and which come to an end before the inner extremity of the element 12. The nozzles 13 are created by means of the application of six guide vanes 14, which are equal one to the other, and which set out slopingly in respect with the axis 11 of the centrifugal device, starting from the hexagonal end feeding section 10 of the outer element 7, going inwards with a helicoidal trend with constant pitch. In other embodiments the distributing nozzles 13 and the corresponding guide vanes 14 may have an essentially helicoidal trend with variable pitch and they may also vary in number, and be either equal or different with respect to each other.

In the embodiments shown in Figures 1 to 5, the guide vanes 14 are tightly assembled with the inner surface of the outer element 7 along the profile of their outer sides, and they are tightly attached to the outer cylindrical surface of the inner element 12 along the profile of their inner sides; it is therefore possible to remove the inner element 12 from the outer element 7 together with the guide vanes 14. In other embodiments the guide vanes 14 may be fixed with inverted connections with respect to the previous case, so that the inner element 12, when removed from the outer one, slides along the inner sides of the said vanes; they can be, on the other hand, tightly attached to both the outer element 7 and the inner one 12, or, in other cases, some of them are tightly attached to the inner element while simultaneously the remaining ones are tightly attached to the outer element 7.

The distributing nozzles, as represented in Figures 1 to 5, are determined by means of the application of guide vanes 14, which are set with a tangential trend with respect to the outer cylindrical surface of the inner element 12; in other embodiments, however, the distributing nozzles may be determined by guide vanes the setting of which, with respect to the inner element 12, may be of any trend inclusive between the tangential and the radial ones, to suit the required working conditions for each particular case. The unit for the total separation and collection is partitioned in three chambers 15, 17 and 18, fluid-tight one to the other, by means of the partition plates 19 and 20 (Figures 1 to 3), or by means of only one partition plate 20 (Figure 4); the whole unit is fluid-tight to the outside. In the embodiment of the unit shown in Figure 4, the hexagonal edges of the end feeding sections of the centrifugal devices, are jointly set contiguous one to the other in continuous connection, side against side, on the same plane (Figure 5), creating thus a honeycomb plane with closed hexagonal meshes. In this way a single continuous feeding section of the particle-laden fluid is formed, which stretches without any interruption between the embodied centrifugal devices, as no interstitial areas exist any more between these devices; thus, consequently and simultaneously, a one-structured and self-bearing assembly comes to be formed which also forms the necessary partition between the feeding chamber of the particle-laden fluid and the collection and discharge chamber of the separated particles, avoiding thus the functional necessity of mounting a fluid-tight partition plate between the two aforesaid chambers. The same honeycomb plane with closed polygonal meshes, without interstitial areas, is moreover obtained with centrifugal devices, the end feeding sections 10 of which are shaped as 3 or 4-sided regular polygons. Other embodiments of total separation and collection units are designed with an assembly of centrifugal devices with polygonal end feeding sections, which devices are, however, arranged and interspaced with respect to each other to suit the required working conditions for each particular case. The centrifugal device can bear any dimensional value, which it is best to reduce to the least, according to its operation efficiency, which increases as its diameter decreases.

The embodiment of the equipment covering only the function of total separtion and collection, as shown in Figure 3, can be realized apart from the combination, for its functional design makes it possible to separate it from the action of the selective separation and collection unit.

The principle of operation of the equipment, which is the subject of this application, is as follows (Figures 1 to 5):

The particle-laden fluid, after having been either exhausted or blown by means not shown in the figures, enters through inlet 1 into chamber 2, which is appropriately sized so as to cause a pre-established reduction in the velocity of the fluid, and it then leaves through the deflection system which is set across outlet 3, after having undergone a sharp bending in its motion, of angular value depending both on the reciprocal position of the inlet and outlet, 1 and 3, respectively, and on the regulable setting and width of the baffles 4 of the deflection system. The particles to be separated, in virtue of their higher inertia with respect to that of the fluid in which they are held in suspension, have a greater tendency than the fluid itself, not to deviate from their original motions and trajectories, which thus gradually come to diverge from the streamlines of the fluid flowing through the selective separation and collection unit. The divergency which is determined between the trajectories of the particles and the streamlines of the flowing fluid, all other conditions remaining unaltered, is greater as the masses of the particles are greater and as the bending which the fluid undergoes in chamber 2 in order to leave hrough the deflection system set across opening 3 is sharper. The granulometric value corresponding to the setting of the selective separation unit is also depending both on the reciprocal positions of the openings 1 and 3, and on the regulable setting and width of the baffles 4 of the deflection system, as well as on the physical granulometric characteristics of the particles held in suspension in the fluid. The fluid which enters into the feeding chamber 17 of the unit for the total separation and collection enters into the centrifugal devices through the distributing nozzles 13, flowing in these nozzles with a helicoidal motion which is gradually accelerated from their inlet to their outlet, with final velocity at the outlet corresponding to the maximum operating efficiency required of the unit. The distributing nozzles 13, having their widest cross section at their inlet, and setting out with a suitable slope with respect to axis 11 of the centrifugal device, make it possible to have the particle-laden fluid entered through the end feeding section into the centrifugal device with a velocity inferior to that at the outlet of the nozzles, lessening thus the pressure loss therein due to impacts and consequent vortex flows of the fluid. In the unit for the total separation and collection as designed in Figure 4, which embodies a plurality of centrifugal devices, with hexagonal end feeding sections 10, and in which the partition plate between the feeding chamber 17 and the collection and discharge chamber 15 of the separated particles is consequently avoided, the feeding of each centrifugal device of the particle-laden fluid is effected through a single continuous section which stretches without any interruption between the centrifugal devices, in view of the fact that no interstitial areas exist among these devices (Figure 5). Such a feeding process, all other conditions remaining unaltered, makes it possible moreover, both to come to a dimensional reduction of the total separation and collection unit, and to improve the operating efficiency of the unit itself, as in fact any existence of interstitial gatherings of the particles conveyed by the incoming fluid is avoided and it also makes it possible to lessen the pressure loss at the feeding inlet of the centrifugal devices, and to eliminate also the losses due to the vortex flows of the fluid caused by the interstitial areas between the said centrifugal devices which are found in other equipment. The particle-laden fluid, after having passed in its downward whirling motion the inner extremity of element 12, gradually reverses and flows outwardly, particle-free, leaving through the element 12 to enter the exhaust chamber 18 whence it leaves through outlet 21. The centrifugated particles, however, are whirled down to the conical extremity of the outer element 7, whence they slide out, through its outlet, dropping in the collection chamber 15 which is fitted with means 16 for their discharge.

While certain preferred embodiments of this invention have been illustrated and described it will be understood that it may be otherwise embodied within the scope of the following claims.

I claim:

1. Apparatus for separating particles from suspension in fluids comprising a fluid-receiving chamber, inlet and outlet means in said chamber positioned to prevent straight line passage from one to the other, a fluid inlet chamber connected to said outlet means and receiving fluid passing therethrough, at least one centrifugal means opening into said fluid inlet chamber and receiving the fluid therefrom, said centrifugal means comprising a polygonal inlet feeding section open to the intake chamber and gradually constricted into an outer hollow cylindrical member, a discharge opening on the end of said outer hollow cylindrical member opposite its connection with the polygonal feeding section, said polygonal inlet section having a substantially greater area than the cross-sectional area of the hollow cylindrical member, an inner hollow cylindrical member within and substantially coaxial with the outer hollow cylindrical member and beginning intermediate the ends thereof, said inner member extending through the polygonal feeding section and through the intake chamber to exhaust out of the intake chamber, at least one substantially helical vane extending between the outer element and the inner element beginning in the polygonal section of greater area and extending with gradually decreasing width to a point adjacent the end of the inner element in the hollow cylindrical member of lesser area whereby a venturi-like nozzle is formed and particle-receiving means in fluid sealing relation with the outer hollow cylindrical member receiving the particles removed from the fluid in the centrifugal means and discharged through the discharge opening in the outer hollow member.

2. Apparatus for separating particles from suspension in fluids as claimed in claim 1 having a plurality of side-by-side centrifugal means in which the polygonal feeding sections are of such shape that each side of each polygon is common with a side of the next adjacent polygon whereby a continuous feeding section area is formed whereby it is possible to eliminate the need for a fluid-sealing plate and thereby eliminate interstitial areas between the centrifugal means.

3. Apparatus for separating particles from suspension as claimed in claim 1 having a plurality of side-by-side centrifugal means provided with hexagonal feeding sections jointly assembled with common sides forming a continuous feeding area whereby it is possible to eliminate the need for a fluid-sealing plate and in turn eliminate interstitial areas between the centrifugal means.

4. Apparatus for separating particles from suspension as claimed in claim 1 in which the helical vanes are of varying pitch from one end to the other.

5. Apparatus for separating particles from suspension as claimed in claim 1 in which the helical vanes may be of different pitch with respect to each other.

6. Apparatus for separating particles from suspension as claimed in claim 1 in which the helical vanes are attached to one of the hollow cylindrical members and the other is slidably removable therefrom.

7. Apparatus for separating particles from suspension as claimed in claim 1 in which some of the helical vanes are attached to one of the hollow cylindrical members and the remaining vanes are attached to the other member and the two are slidably removable from one another together with their attached vanes.

8. Apparatus for separating particles from suspension in fluids comprising a fluid-intake chamber, inlet means through which particle-laden fluid may be introduced into said fluid-intake chamber, at least one centrifugal means opening into said fluid-inlet chamber and receiving the fluid therefrom, said centrifugal means comprising a polygonal inlet feeding section open to the intake chamber and gradually constricted into an outer hollow cylindrical member, a discharge opening on the end of said outer hollow cylindrical member opposite its connection with the polygonal feeding section, said polygonal inlet section having a substantially greater area than the cross-sectional area of the hollow cylindrical member, an inner hollow cylindrical member within and substantially coaxial with the outer hollow cylindrical member and beginning intermediate the ends thereof, said inner member extending through the polygonal feeding section and through the intake chamber to exhaust out of the intake chamber, at least one substantially helical vane between the outer element and the inner element beginning in the polygonal section and extending with gradually decreasing width to a point adjacent the end of the inner element whereby a venturi-like nozzle is formed, and particle-receiving means in fluid sealing relation with the outer hollow cylindrical member receiving the particles removed from the fluid in the centrifugal means and discharged through the discharge opening in the outer hollow member.

9. In apparatus for separating particles from suspension in fluids, a centrifugal separator comprising a polygonal inlet feeding section receiving particle-laden fluid, said polygonal section being gradually constricted into an outer hollow cylindrical member, a discharge opening on the end of said outer hollow cylindrical member opposite its connection with the polygonal feeding section, said polygonal inlet section having a substantially greater area than the cross-sectional area of the hollow cylindrical member, an inner hollow cylindrical member within and substantially coaxial with the outer hollow member and beginning intermediate the ends thereof, said inner member extending through and beyond the polygonal feeding section and sealed therefrom, at least one substantially helical vane between the outer element and the inner element beginning in the polygonal section and extending with gradually decreasing width to a point adjacent the end of the inner element whereby a venturi-like nozzle is formed, and particle-receiving means in fluid-sealing relation with the outer hollow cylindrical member receiving the particles removed from the fluid in the centrifugal means and discharged through the discharge opening in the outer hollow member.

10. In apparatus for separating particles from suspension in fluids, a centrifugal separator comprising a polygonal inlet feeding section receiving particle-laden fluid, said polygonal section being gradually constricted into an outer hollow cylindrical member, a discharge opening on the end of said outer hollow cylindrical member opposite its connection with the polygonal feeding section, said polygonal inlet section having a substantially greater area than the cross-sectional area of the hollow cylindrical member, an inner hollow cylindrical member within and substantially coaxial with the outer hollow member and begininng intermediate the ends thereof, said inner member extending through and beyond the polygonal feeding section and sealed therefrom and at least one substantially helical vane between the outer element and the inner element beginning in the polygonal section and extending with gradually decreasing width to a point adjacent the end of the inner element whereby a venturi-like nozzle is formed.

11. Apparatus for separating particles from suspension in fluids comprising a pair of main chambers, a passage connecting said main chambers, inlet means through which a particle-laden fluid may be introduced into one of said chambers at an angle to the passage between the main chambers whereby the fluid follows a deviate path from the inlet means to said passage, deflecting means in said passage deflecting the fluid therethrough out of a straight line path, means in said one chamber receiving particles removed from the fluid, a fluid-intake chamber in the other main chamber receiving the fluid passing through the deflecting means, at least one centrifugal means opening into said fluid-inlet chamber and receiving the fluid therefrom, said centrifugal means comprising a polygonal feeding section open to the intake chamber and gradually constricted into an outer hollow cylindrical member, a discharge opening on the end of said outer hollow cylindrical member opposite its connection with the polygonal feeding section, an inner hollow cylindrical member within and substantially coaxial with the outer hollow cylindrical member and beginning intermediate the ends thereof, said inner member extending through the polygonal feeding section and through the intake chamber to an exhaust chamber in said other main chamber, said exhaust chamber being separated from the intake chamber by a fluid-sealing plate, at least one substantially helical vane between the outer element and the inner element beginning in the polygonal section and extending with gradually decreasing cross section to a point adjacent the end of the inner element whereby a venturi-like nozzle is formed, and particle-receiving means in fluid-sealing relation with the outer hollow cylindrical member receiving particles from the discharge opening therein.

12. Apparatus for separating particles from suspension in fluids as claimed in claim 11 having a plurality of side-by-side centrifugal means in which the polygonal feeding sections are of such shape that each side of each polygon is common with a side of the next adjacent polygon whereby a continuous feeding area is formed whereby it is possible to eliminate the need for a fluid-sealing plate and in turn to eliminate interstitial areas between the centrifugal means.

13. Apparatus for separating particles from suspension as claimed in claim 11 having a plurality of side-by-side centrifugal means provided with hexagonal feeding sections with common sides forming a continuous feeding area whereby it is possible to eliminate the need for a fluid-sealing plate and in turn to eliminate interstitial areas between the centrifugal means.

14. Apparatus for separating particles from suspension as claimed in claim 11 in which the helical vanes are of varying pitch from one end to the other.

15. Apparatus for separating particles from suspension as claimed in claim 11 in which the helical vanes are of different pitch with respect to each other.

16. Apparatus for separating particles from suspension in fluids comprising a pair of main chambers, a passage connecting said main chambers, means introducing a particle-laden fluid into one of said main chambers at an angle to the passage between the main chambers whereby the fluid follows a deviate path to reach the passage, means in said passage deflecting the fluid passing therethrough out of a straight line path, a fluid-intake chamber in said other main chamber receiving the fluid from the passage, a polygonal feeding section opening into said intake chamber and receiving fluid therefrom, said polygonal feeding section gradually constricting to connect with one end of an outer hollow cylindrical member, a tapered substantially conical section connected to the opposite end of said cylindrical member and terminating in a discharge opening, a discharge chamber in said other main chamber adjacent the inlet chamber and surrounding the cylindrical member, said discharge chamber being separated from the intake chamber by a fluid-sealing plate connected to the polygonal section, said discharge chamber receiving the discharge from the discharge opening of the substantially conical member, an inner hollow cylindrical element within and substantially coaxial with the outer hollow cylindrical member beginning intermediate the ends thereof and extending out of the polygonal section and through the intake chamber to a fluid-outlet chamber in said other main chamber, said fluid-outlet chamber being separated from the intake chamber by a second fluid-sealing plate whereby the fluid entering the intake chamber passes through the polygonal feeding section into the outer cylindrical member and then through the inner cylindrical member to the fluid-outlet chamber, and at least one helical vane between the outer element and the inner element beginning at the polygonal section and extending with decreasing cross section to a point adjacent the end of the inner element whereby a venturi-like nozzle is formed.

17. Apparatus for separating particles from suspension in fluids comprising a main chamber, a fluid-intake chamber within said main chamber, inlet means through which a particle-laden fluid may be introduced into said inlet chamber, a polygonal inlet feeding section opening into said intake chamber and receiving fluid therefrom, said polygonal feeding section gradually constricting to connect with one end of an outer hollow cylindrical member, said polygonal inlet section having a substantially greater area than the cross-sectional area of the hollow cylindrical member, a tapered substantially conical section connected to the opposite end of said cylindrical member and terminating in a discharge opening, a discharge chamber in the main chamber adjacent the inlet chamber and surrounding the cylindrical member, said discharge chamber being separated from the intake chamber by a fluid-sealing plate connected to the polygonal feeding section, said discharge chamber receiving the discharge from the discharge opening of the substantially conical member, an inner hollow cylindrical element within and substantially coaxial with the outer hollow cylindrical member beginning intermediate the ends thereof and extending out of the polygonal feeding section and through the intake chamber to a fluid-outlet chamber in the main chamber, said fluid-outlet chamber being separated from the intake chamber by a second fluid-sealing plate whereby the fluid entering the intake chamber passes through the polygonal feeding section into the outer cylindrical member and then through the inner cylindrical member to the fluid-outlet chamber, and at least one helical vane between the outer element and the inner element beginning at the polygonal section and extending with decreasing width to a point adjacent the end of the inner element whereby a venturi-like nozzle is formed.

18. In apparatus for separating particles from suspension in fluids, a centrifugal means comprising a polygonal inlet feeding section, means delivering particle-laden fluid to said polygonal feeding section, said polygonal feeding section gradually constricting to connect with one end of an outer hollow cylindrical member, said polygonal inlet section having a substantially greater area than the cross-sectional area of the hollow cylindrical member, a tapered substantially conical section connected to the opposite end of said cylindrical member and terminating in a discharge opening, an inner hollow cylindrical member within and substantially coaxial with the outer hollow cylindrical member beginning intermediate the ends thereof, and extending out of the polygonal feeding section and fluid sealed therefrom and at least one substantially helical vane between the outer element and the inner element beginning in the polygonal section and extending with gradually decreasing width to a point adjacent the end of the inner element whereby a venturi-like nozzle is formed.

19. Apparatus for separating particles from suspension in fluids comprising a fluid-intake chamber, inlet means through which particle-laden fluid may be introduced into said fluid-intake chamber, at least one centrifugal means opening into said fluid-inlet chamber and receiving the fluid therefrom, said centrifugal means comprising a polygonal inlet feeding section open to the intake chamber and gradually constricted into an outer hollow cylindrical member, said polygonal inlet section having a substantially greater area than the cross-sectional area of the hollow cylindrical member, a discharge opening on the end of said outer hollow cylindrical member opposite its connection with the polygonal feeding section, an inner hollow cylindrical member within and substantially coaxial with the outer hollow cylindrical member and beginning intermediate the ends thereof, said inner member extending through the polygonal feeding section and through the intake chamber to exhaust out of the intake chamber, at least one substantially helical vane between the outer element and the inner element extending to a point adjacent the end of the inner element, whereby at least one venturi-like nozzle is formed between the inner and outer elements, and particle-receiving means in fluid-sealing relation with the outer hollow cylindrical member receiving the particles removed from the fluid in the centrifugal means and discharged through the discharge opening in the outer hollow member.

20. In apparatus for separating particles from suspension in fluids, an element comprising a generally frusto-conical hollow member, the large end of which forms a fluid inlet section having a substantially greater cross-sectional area than the cross-sectional area of the smaller end, at least one substantially helical internal vane beginning adjacent the inlet end of the frusto-conical member and extending to the opposite end thereof with gradually decreasing cross section, said vane forming a cylindrical axial passage adapted to receive a hollow cylindrical discharge element whereby a helical passage of decreasing cross section is formed between said discharge element, the vane and the frusto-conical member imparting a controlled, rapid increase in the velocity of the fluid passing therethrough.

21. In apparatus for separating particles from suspension in fluids, an element comprising a generally frusto-conical hollow member, the large end of which is formed into a polygonal inlet section having a substantially greater cross-sectional area than the smaller end, at least one substantially helical internal vane beginning adjacent the inlet end and extending to the opposite end thereof with gradually decreasing width, said vane forming a cylindrical axial passage adapted to receive a hollow cylindrical discharge element whereby a helical passage of decreasing cross section is formed between the discharge element, the vane and the frusto-conical member imparting a controlled, rapid increase in the velocity of the fluid passing therethrough.

22. In apparatus for separating particles from suspension in fluids, an element as claimed in claim 21 having a substantially helical internal vane beginning at each angle of the polygon and extending to the smaller end of the frusto-conical member with gradually decreasing cross section whereby a series of helical passages of decreasing cross section are formed between the vanes, the discharge element and the frusto-conical member imparting a controlled rapid increase in the velocity of the fluid passing therethrough.

23. In apparatus for separating particles from suspension in fluids, a centrifugal separator comprising an outer tube having an inlet and a discharge, an inner axially extending tube spaced from the outer tube and forming therebetween an annular passage of substantially greater cross section at the inlet end than adjacent the discharge end, a helical internal vane beginning adjacent the inlet end and extending to the discharge end with gradually decreasing cross section, said vane being in contact with the outer tube and the inner tube and forming therewith a helical passage of decreasing cross section imparting a controlled rapid increase in the velocity of the fluid passing therethrough.

References Cited in the file of this patent

UNITED STATES PATENTS

| 1,214,249 | Williams | Jan. 30, 1917 |
| 1,925,373 | Davies | Sept. 5, 1933 |
| 2,086,882 | Seitz | July 13, 1937 |
| 2,461,677 | Burdock et al. | Feb. 15, 1949 |
| 2,553,175 | Davenport et al. | May 15, 1951 |
| 2,620,046 | Bonameau | Dec. 2, 1952 |
| 2,659,451 | Baird | Nov. 17, 1953 |

FOREIGN PATENTS

| 1,021,374 | France | Dec. 3, 1952 |

OTHER REFERENCES

Rock Products, April 30, 1927, reprinted January 1928, page 8 of reprint. (Copy in Division 55.)